(12) United States Patent  (10) Patent No.: US 6,484,019 B1
Aklian  (45) Date of Patent: Nov. 19, 2002

(54) COMBINED COMPUTER KEYBOARD AND RADIO APPARATUS

(76) Inventor: Mannix V. Aklian, 29 Miller St., Somerville, MA (US) 02144

( * ) Notice: Subject to any disclaimer, the term of this patent is extended or adjusted under 35 U.S.C. 154(b) by 0 days.

(21) Appl. No.: 09/420,446

(22) Filed: Oct. 18, 1999

(51) Int. Cl.[7] ............ H04B 1/06; H05K 11/00
(52) U.S. Cl. ............ 455/344; 455/556; 455/347; 345/168
(58) Field of Search ............ 455/556, 557, 455/344, 347, 348, 349, 350, 351, 550, 343, 346, 572, 90, 128, 66; 341/22; 345/168, 169

(56) References Cited

U.S. PATENT DOCUMENTS

| | | | |
|---|---|---|---|
| 4,481,382 A | * 11/1984 | Villa-Real | 455/556 |
| 5,375,165 A | 12/1994 | Haber | |
| 5,617,474 A | * 4/1997 | Ditzig et al. | 455/550 |
| 5,717,430 A | 2/1998 | Copland et al. | |
| 5,892,503 A | 4/1999 | Kim | |
| 5,900,867 A | * 5/1999 | Schindler et al. | 345/327 |
| 5,926,170 A | * 7/1999 | Oba | 341/22 |
| 5,929,774 A | * 7/1999 | Charlton | 455/556 |
| 6,011,495 A | * 1/2000 | Chen | 341/22 |

* cited by examiner

Primary Examiner—Vivian Chin
Assistant Examiner—Eliseo Ramos-Feliciano
(74) Attorney, Agent, or Firm—Lambert & Associates; Gary E. Lambert; Edward Timmer

(57) ABSTRACT

A combined computer keyboard and radio apparatus for use with a computer having a CPU contained in a housing comprising a keyboard housing, the keyboard housing is separate from the computer CPU housing and a plurality of alphanumeric keys are mounted in said keyboard housing, a selectively tunable radio unit located in the keyboard housing having circuitry isolated and independent of the keyboard circuitry and at least one speaker mounted within said keyboard housing for audibly reproducing the radio frequency waves received by said radio receiver whereby the radio unit may be played for the listening pleasure of the user without impacting, using or otherwise impacting the resources of the computer to which the combined computer keyboard and radio apparatus is interfaced.

11 Claims, 3 Drawing Sheets

COMBINED COMPUTER KEYBOARD AND RADIO APPARATUS

BACKGROUND OF THE INVENTION

This invention relates to computer keyboards. More particularly, this invention relates to an apparatus of a combined computer keyboard and a radio in a single unitary housing.

Personal computers have gained great popularity in recent years. The evergrowing popularity of personal computers is so pervasive and widespread that personal computers have become viewed as a necessary and "must have" item. Personal computers occupy a great percentage of office desks and homes as well. Although personal computers were originally designed as a tool to accomplish specific work tasks such as calculating and word processing, their role has expanded to include entertaining and gaming as well. While the use of personal computers for entertainment purposes such as playing games or editing photos and home movies has expanded, the personal computer is still used for the mundane and not-so-exciting tasks of tracking finances, word processing, calculating and editing spreadsheets and the like by most people—at least part of the time that they use their PC. Many people have a desire to listen to music as they work, at a computer or otherwise. For many people, listening to music while working is both comforting and relaxing.

While there are numerous hardware and software products that interface with computers enabling the computer to play and edit music, most of these products use at least a portion of the computer's resources and/or are cumbersome to install and use. The available hardware and software is usually installed in or attaches to the computer as an add-on peripheral feature. In either case, the hardware and software typically uses some of the computer's resources such as memory and/or power. Hardware externally attached to the computer, for the most part, is connected to the computer via cables. Cables are unsightly and difficult to neatly manage. Even when using hardware components that communicates with the computer via wireless communications means, the hardware components still use valuable desktop real estate. Additionally, the typical computer add-on must be accounted for by the host computer. Utilizing and allocating system resources to track and manage add-on peripheral devices, including those capable of producing music, is often time consuming to configure and quite often causes system interrupts during the operation of the host computer.

Attempts have been made in the past to consolidate computer hardware so as to conserve desktop space for the usual core essentials of a computer, namely the central processor unit, monitor, keyboard and pointing device. Most of the past attempts however, at most, consolidate traditional computer hardware and traditional computer multimedia components such as a CD-ROM, a DVD-ROM, a modem, speakers, cameras or microphones. In U.S. Pat. No. 5,892,503 there is disclosed a multimedia console keyboard that combines speakers; microphone; volume control; monitor function control; computer power control switch and integrated analog-to-digital processors. The disclosed device does not alleviate the problem of computer resource allocation associated with adding hardware to a typically configuration computer. The disclosed device attempts to ease the problem by providing analog-digital preprocessors but the device is still dependant on the host computer's resources. The disclosed and consolidated configuration of components comprise typical multimedia add-on components. U.S. Pat. No. 5,717,430 discloses a multimedia keyboard also. This device too combines traditional computer multimedia components that also require and use resources of the host computer. Each of these disclosed devices uses at least a portion of the host computer's resources when used to play music for the listening pleasure of the computer user. Each device is dependent on the host computer for hardware and software support in order to operate.

The prior art combined keyboard devices merely provide for the consolidation of the typical computer multimedia peripherals, including music producing peripheral device add-ons, into a single unitary keyboard housing without alleviating the problems of: (1) requiring system resources for the operation of the music producing add-on; (2) complicated configuration of the host computer to interface the music producing add-on; and (3) requiring powered operation of the host computer in order to operate the music producing add-on.

SUMMARY OF THE INVENTION

It is therefore an object of this invention to provide a combined computer keyboard and radio apparatus that is conveniently housed in a single computer keyboard housing that operates independently of the host computer to which the combined computer keyboard and radio apparatus is interfaced.

It is also an object of the present invention to provide a combined computer keyboard and radio apparatus that is controlled independently of the host interface computer, thereby obviating the allocation of host interface computer system resources for the operation of the combined computer keyboard and radio apparatus yet providing radio reception and playback for the listening enjoyment of the computer user without risk of impacting the operation of the computer.

It is also an object of the present invention to provide a device that may be used notwithstanding whether the host computer is in the operational on state.

It is a further object of this invention to provide a combined computer keyboard and radio apparatus that is easy to control yet ergonomically elegant in design and function.

It is a further object of this invention to provide a combined computer keyboard and radio apparatus that is capable of being powered by a source independent of the host computer or instead by conveniently drawing minimal power from the host computer.

It is a further object of this invention to provide a combined computer keyboard and radio apparatus that does not compromise the operation of the host computer.

It is a further object of this invention to provide a combined computer keyboard and radio apparatus that can be readily retrofitted to preexisting computer systems easily without resorting to using tools, software or other hardware modifications.

It is a further object of this invention to provide a combined computer keyboard and radio apparatus that is easy to use and manufacture, as well as cost effective.

This invention results from the realization that a convenient, easy-to-use and highly adaptable combined computer keyboard and radio apparatus can be effectuated by combining a computer keyboard and radio receiver within a single unitary housing, wherein the radio receiver's circuitry is totally independent from the keyboard or other associated circuitry of the computer system to which the combined computer keyboard and radio apparatus is interfaced. The combined computer keyboard and radio apparatus is conveniently mounted in a computer keyboard housing having alphanumeric keys arranged in the traditional and customary location and spacing. The combined computer keyboard and radio apparatus also has speakers that are also housed within the single computer keyboard housing as the radio.

This invention features a combined computer keyboard and radio apparatus comprising a computer keyboard housing having alphanumeric keys mounted therein; a radio receiver located within the keyboard housing and at least one speaker for outputting the radio frequencies tuned by the radio receiver. The combined computer keyboard and radio apparatus further comprises a radio receiver having associated audio control circuitry for controlling the bass, treble, volume and other aspects of the sound reproduced by the radio. The radio unit farther includes an antenna for improved reception of radio frequency waves. The combined computer keyboard and radio apparatus also features a display means for providing useable information to a user so that the user may selectively control the features of the radio such as on/off, volume, station memory setting and presets, and alarm clock functions. The combined computer keyboard and radio apparatus may be powered exclusively by a battery source isolated from and independent of the computer's power source or alternatively the combined computer keyboard and radio apparatus may derive its minimal power needs from the convenient power circuitry controlling the keyboard.

DETAILED DESCRIPTION OF THE PREFERRED EMBODIMENT

Figure 1:
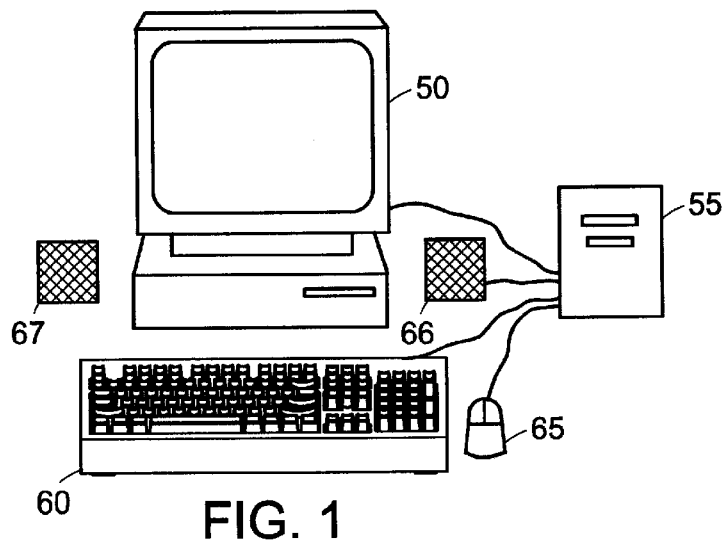
FIG. 1 is a depiction of a prior art computer system, showing a typical configuration of such a system.
Figure 1A:
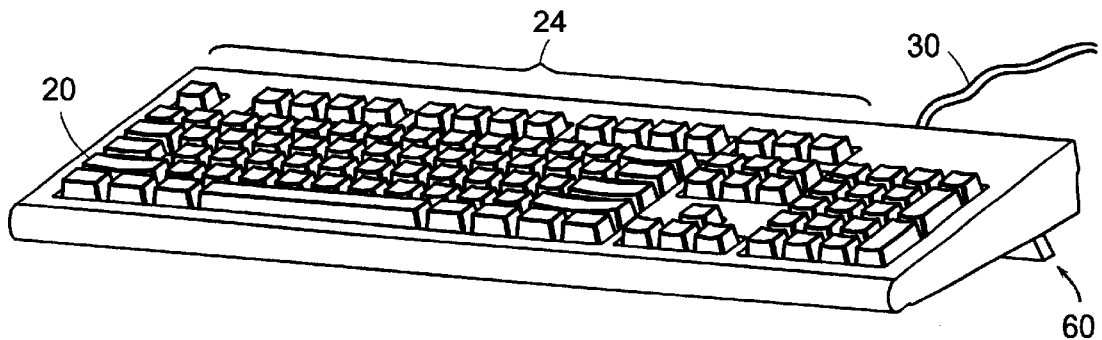
FIG. 1a is a depiction of the computer keyboard of the prior art computer system.

Referring to FIG. 1, a prior art computer system configuration 70 is depicted. The prior art computer system 70 includes a monitor 50, a CPU 55, a keyboard 60, a pointing device 65. Also shown are two speakers, 66 and 67, that are each interfaced to the CPU 55 for playing audio. It should be noted that the speakers 66 and 67 each require placement space. The speakers 66 and 67 generally must also be recognized and accounted for by the computer operating system in order for the speakers 66 and 67 to properly operate in a functional mode FIG. 1a depicts a perspective view of the prior art keyboard 60. The layout and number of alphanumeric keys located on the keyboard 60 is the typical and most common configuration for a computer keyboard. The likelihood of computer user acceptance of any improved keyboard is greatly increased if the improved keyboard maintains the traditional and familiar spacing and configuration of traditional computer keyboards as shown in FIG. 1a.

Figure 2:
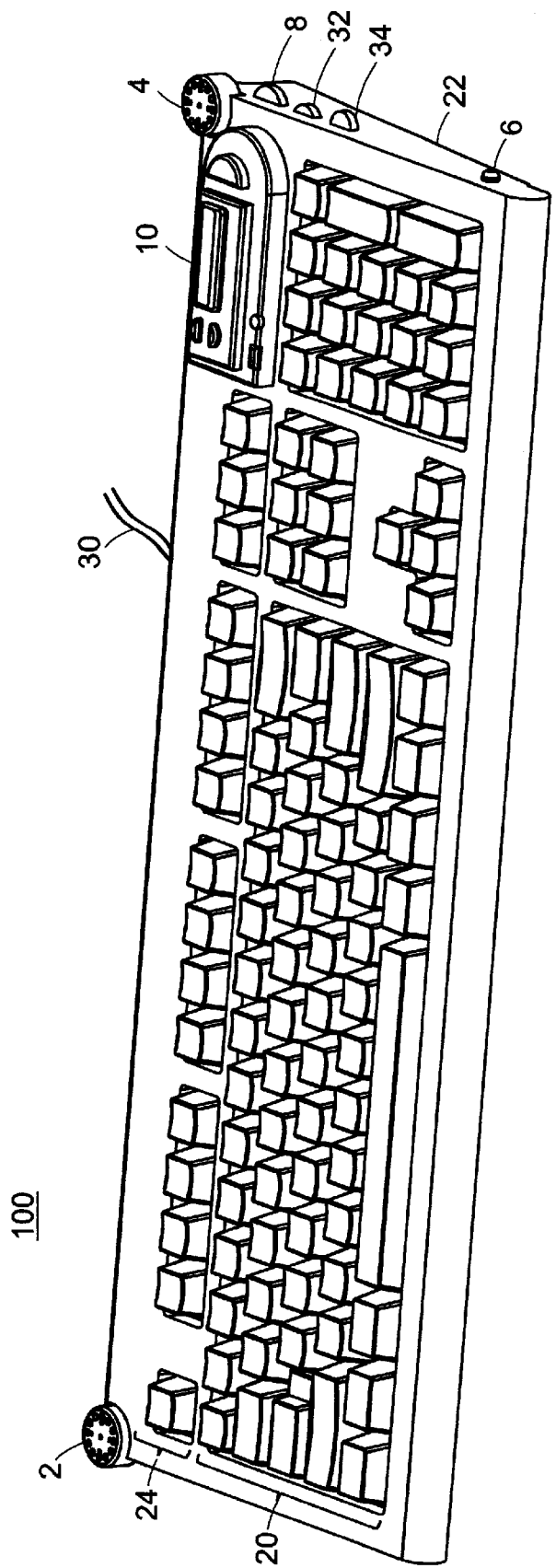
FIG. 2 is a perspective view of the preferred embodiment of the combined computer keyboard and radio apparatus of the present invention.

Now, referring to FIG. 2 is shown a preferred embodiment of the combined keyboard and radio apparatus, depicted generally at 100, of the present invention. It is important and significant to first note that the combined keyboard and radio apparatus 100 of the present invention has a plurality of alphanumeric keys 20 mounted in a keyboard housing 22. The plurality of alphanumeric keys 20 are arranged in a manner similar to the traditional layout and configuration of the alphanumeric keys of the prior art keyboard 60 shown in FIG. 1.

In addition to the traditionally configured alphanumeric keys 20, there is also a radio unit 10 mounted in the keyboard housing 22 of the present invention. As shown, the radio unit 10 is mounted in the keyboard housing 22 in an area of the keyboard housing 22 that usually does not contain alphanumeric keys or other user accessible alphanumeric keys or components. In the preferred embodiment, the radio unit 10 is mounted in the upper right area of the keyboard housing 22, typically above the row of function keys 24. The placement of the radio unit 10 in this area of the keyboard housing 22 is important in so far as the location of the radio unit 10 mounted within the keyboard housing 22 does not alter the traditional and user accustomed configuration of the plurality of alphanumeric keys 20. While the plurality of alphanumeric keys 20 may also be altered to accommodate the placement of the radio unit 10 at most any point on the keyboard housing 22, it is believed that placement of the radio unit 10 in an area of the keyboard housing 22 that traditionally has not supported alphanumeric keys will ease user transition from traditional keyboards to the combined keyboard and radio apparatus of the present invention and also minimize changes to the manufacturing processes required to produce the present invention Although mounted in the keyboard housing 22 along with the plurality of alphanumeric keys 20, the radio unit 10 is preferably electrically isolated and independent of any keyboard circuitry. Save for the radio unit 10 optionally receiving operational power from the voltage source powering the keyboard circuitry, the radio unit 10 is electrically isolated from all keyboard circuitry. The electrically isolated radio unit 10 can thus operate without reliance on the operation of the computer to which the combined keyboard and radio apparatus 100 is interfaced. The radio unit 10 is normally and in most embodiments at least optionally powered from a battery source 28 that is independent of the keyboard, the CPU and any associated circuitry of those or other components associated with the computer to which the combined keyboard and radio apparatus 100 is interfaced.

Figure 5:
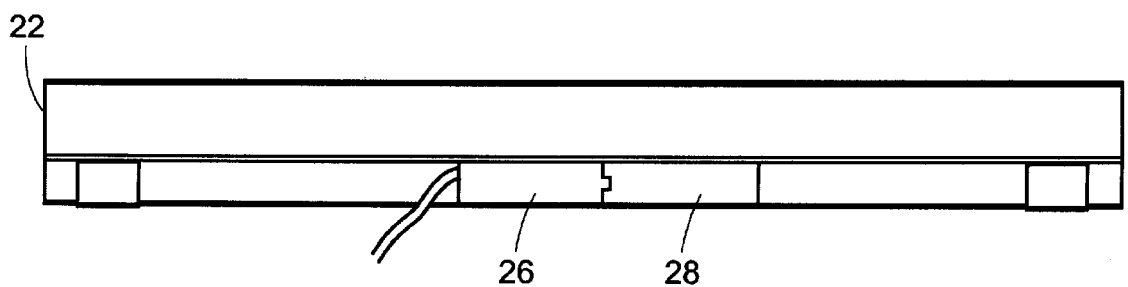
FIG. 5 is a depiction of the present invention showing the rear edge of the keyboard housing, including the battery compartment located thereon.

The battery source 28 is shown in FIG. 5. The batteries of the battery source 28 are housed in battery compartment 26 located along the rear edge of the keyboard housing in the preferred embodiment. Typically, the radio unit 10 requires very little power to functionally operate. The preferred embodiment of the radio unit 10 can typically be powered by two 1.5 v, size AA batteries that are commercially available from a multitude of manufacturers. The power source is not limited to the preferred embodiments listed herein and may be supplied by any number of power supply sources and types known to those skilled in the art of electronics, including but not limited to an independent and separate AC or AC to dc power transformer, solar power, etc.

Figure 3:
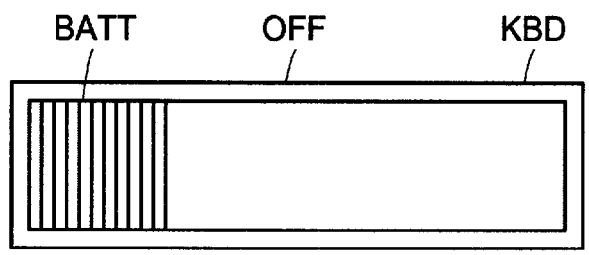
FIG. 3 is a detailed depiction of the power source select switch thereof.

With reference to FIG. 2, there is a power source select switch 8 located along the right side outer edge of the keyboard housing 22. A clearer understanding of the power source select switch 8 may be had by referring to FIG. 3. The preferred embodiment of the present invention may be powered from the battery source 28 or in the alternative, from the power supply powering the keyboard circuitry. The keyboard circuitry is powered from the separately located CPU via a control and signal cable 30. The voltage necessary to power the radio unit 10 may be greater than or less than the power required by the keyboard circuitry, therefore the incoming keyboard voltage may have to be amplified or divided, respectfully, in order to obtain the requisite supply voltage required by the radio unit 10. In the preferred embodiment, the voltage required by the radio unit 10 is less than the voltage supplied by to the keyboard circuitry via the control and signal cable 30. A voltage divider circuit is used to get the requisite voltage for the radio unit 10. The manner in which the voltage powering the radio unit 10 is derived from the keyboard circuitry may be accomplished by using a variety of circuits and components, as is known in the art. Therefore, the manner in which the voltage for powering the radio unit 10 is obtained from the keyboard circuitry is not to be limited by the above preferred disclosure.

Figure 4:
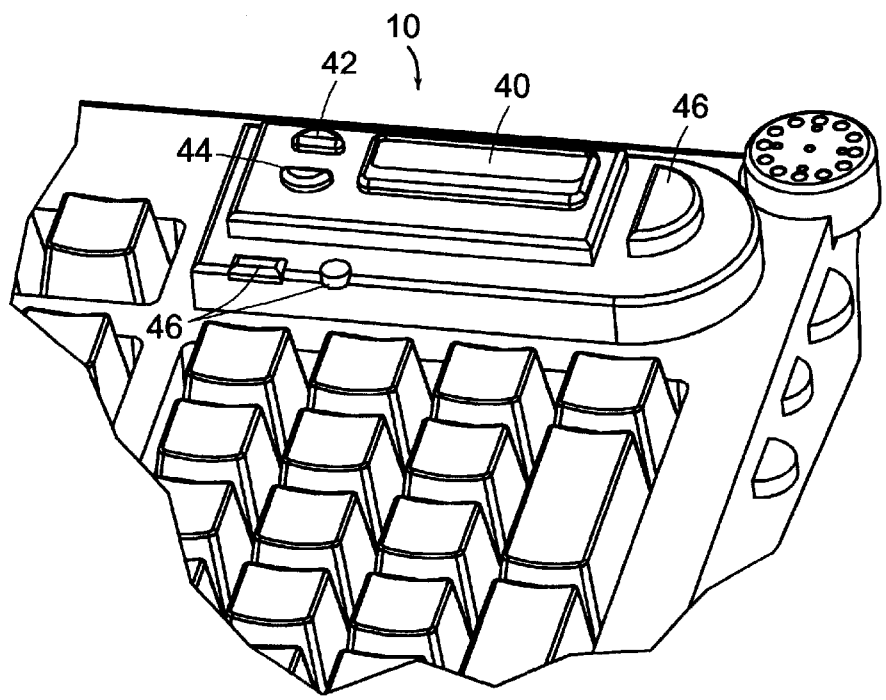
FIG. 4 is a detailed view of the radio receiver unit thereof.

The radio unit 10 of the preferred embodiment typically has a number of features and controls by which the user can control and thus enhance their radio listening pleasure. The radio unit 10 typically has a display means for displaying information to the user in an understandable format. The radio unit 10 and its associated display means 40, may be better understood by referring to FIG. 4. The radio unit 10 of the preferred embodiment provides users of new and existing computers using this invention the ability to enjoy AM and FM band frequency stations. The radio unit 10 features (1) a digital tuner, including station presets and memory recall functions of the station presets; (2) a selectively settable clock, including alarm functions; (3) audio reproduction quality controls, such as but not limited to tone, bass and treble; (4) mono/stereo selection functions; (5) a distance(DX)/Local tuner sensitivity selection function; and (6) volume control, including a mute function. The volume 32 and DX/Local receiver sensitivity 34 controls are located on the right side edge of the keyboard housing 22 instead of being controlled by controls located on the radio unit 10. The radio unit 10 has control buttons 46 for selectively controlling and setting the features of the radio unit 10. Particular features of the radio unit 10 may be selected and variably changed by manipulation of the control buttons 46. The set values of the various features are displayed by the display means 40. A pair of buttons, 42 and 44 are provided to allow increasing via button 42, or decreasing via button 44, the valued of selected functions.

The display means 40 comprises a LCD in the preferred embodiment. The display means may however take the form of LED's, an analog readout or other display means as are known by those skilled in the art.

Also provided along the right side of the keyboard housing 22 is a headphone jack 6, as shown in FIG. 2. Typically, the headphone jack 6 is a 3.5 millimeter(mm) mini-jack and is commonly known to those skilled in the art. The headphone jack is provided for the private listening pleasure of the combined keyboard and radio apparatus 100 user. The headphone jack 6 is connected to the radio unit's output that feeds a pair of speakers 2 and 4 located in the keyboard housing. Interrupt circuitry is provided with the headphone jack wherein connecting headphones or external speakers to the headphone jack 6 interrupts the signal output to the speakers and only provides the output from the radio unit 10 to headphone jack 6.

As such the method of making and using the device detailed above constitutes the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these other embodiments may be resorted to without departing from the invention. By way of example, the invention may be adapted to be used in a combined keyboard and radio apparatus that communicates with the CPU via wireless communication means or alternatively in a laptop keyboard. Therefore the form of the invention set out above should be considered illustrative and not as limiting the scope of the following claims.

What I claim is:

1. A combined computer keyboard and radio apparatus for use with a computer having a CPU contained in a housing comprising:

a keyboard housing wherein said keyboard housing is separate from the computer CPU housing and a plurality of alphanumeric keys are mounted in said keyboard housing;

a selectively tunable radio unit located in said keyboard housing wherein said radio unit receives radio frequency waves;

at least one speaker mounted within said keyboard housing for audibly reproducing the radio frequency waves received by said radio unit;

a cable interconnecting the combined keyboard and radio apparatus and the CPU wherein a plurality of wires comprises said cable, wherein at least one of said plurality of wires provides power for said radio unit; and a battery source located within said combined keyboard and radio apparatus housing for providing power to said radio unit, wherein power for said radio unit is selectively switchable between said battery source located in the combined keyboard and radio apparatus housing and at least one of said plurality of wires comprising said cable interconnecting the combined keyboard and radio apparatus and the computer CPU providing power to said radio unit by a switch mounted on said keyboard housing.

2. The combined keyboard apparatus of claim 1 wherein the combined keyboard and radio apparatus communicates with the CPU via wireless communication means.

3. The combined keyboard and radio apparatus of claim 1 further including two speakers mounted in said keyboard housing.

4. The combined keyboard and radio apparatus of claim 3 further including a selectively switchable switch for interrupting the function of said two speakers.

5. The combined keyboard and radio apparatus of claim 1 wherein said radio unit further includes digital tuning means.

6. The combined keyboard and radio apparatus of claim 1 wherein said radio unit further includes display means for displaying clock and radio functionals.

7. The combined keyboard and radio apparatus of claim 1 wherein said radio unit further includes a selectively settable clock.

8. The combined keyboard and radio apparatus of claim 1 further including a headphone jack mounted on said keyboard housing for connecting said radio unit to external headphones and speakers.

9. The combined keyboard and radio apparatus of claim 8 further including an interrupt circuitry connected to said headphone jack for interrupting function of said at least one speaker when headphones and external speakers are connected to said headphone jack.

10. The combined keyboard and radio apparatus of claim 1 further including a selectively switchable switch for interrupting the function of said at least one speaker.

11. The combined keyboard and radio apparatus of claim 1 wherein said radio receiver further includes an audio control circuitry for selectively varying the audio response of said radio receiver.

* * * * *